Nov. 2, 1948.                J. M. VAN BEUREN                2,452,880
                             ELECTRONIC VOLTMETER
Filed July 8, 1944                                      3 Sheets-Sheet 1
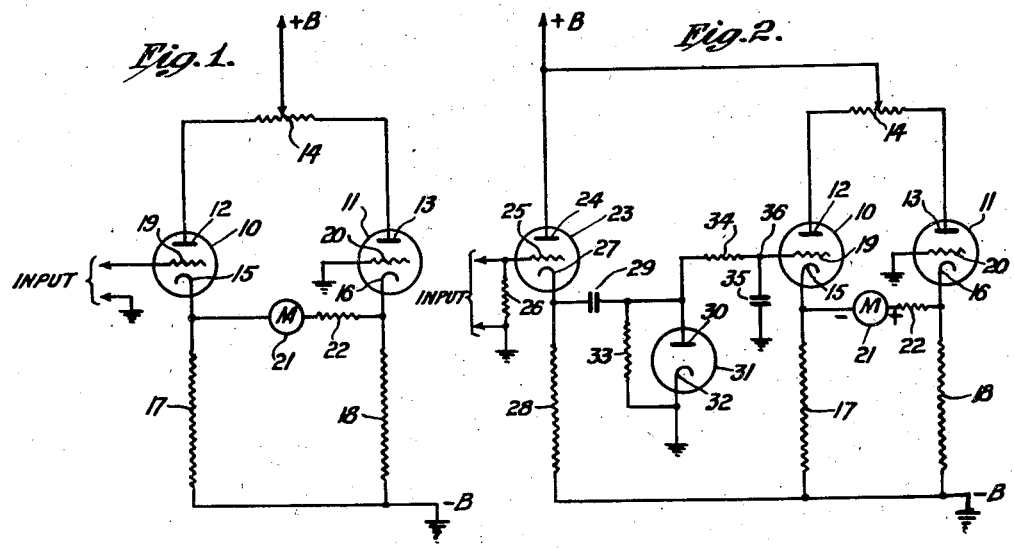
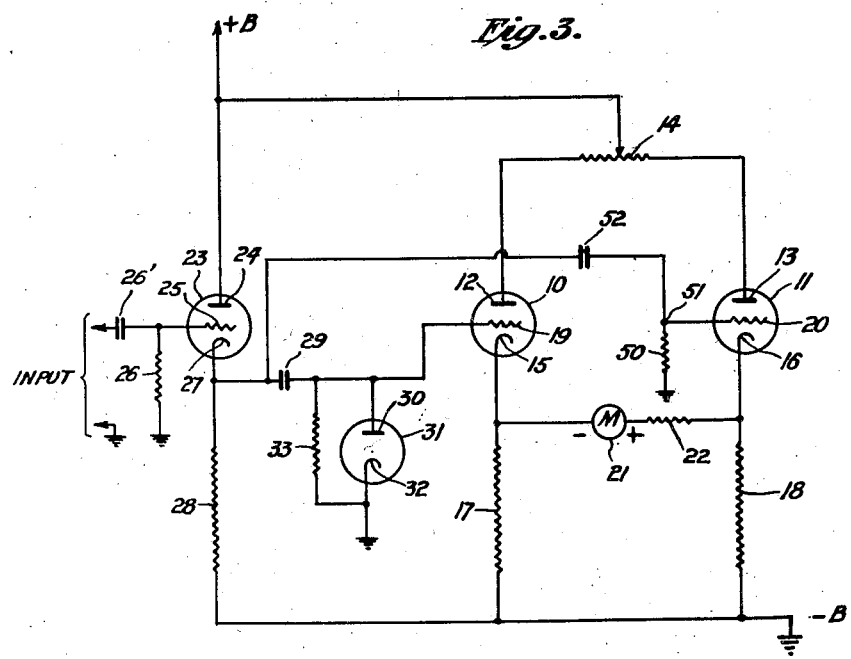
INVENTOR
John M. van Beuren
BY Roger Williams
ATTORNEY Nov. 2, 1948.                J. M. VAN BEUREN                 2,452,880
                              ELECTRONIC VOLTMETER
Filed July 8, 1944                                       3 Sheets-Sheet 2
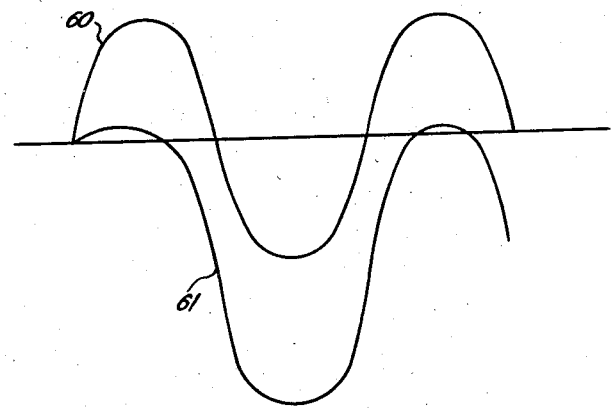
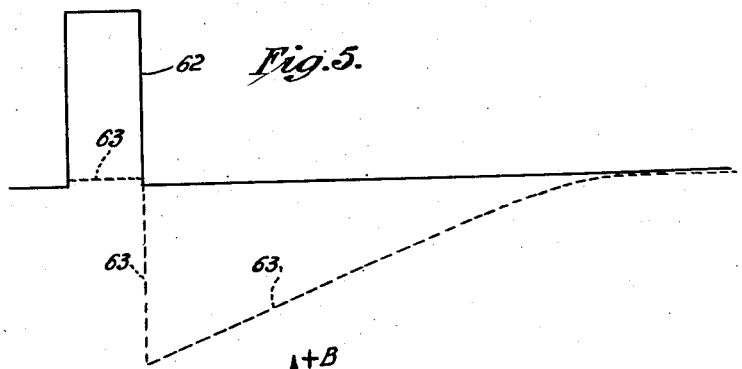
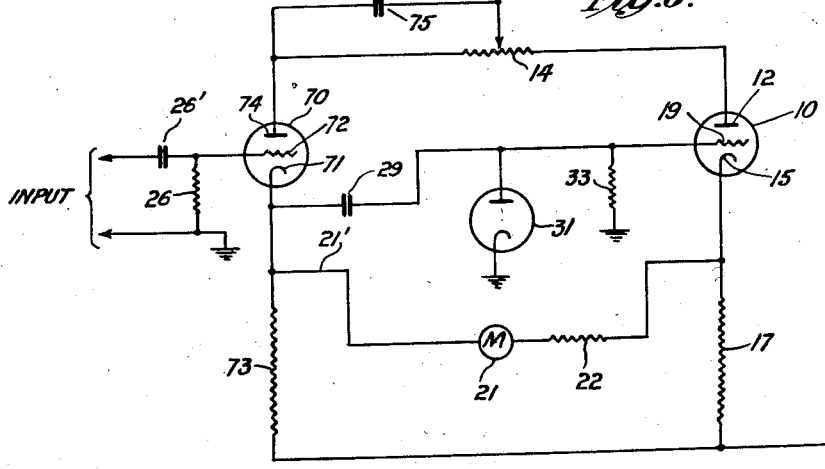
INVENTOR
John M. van Beuren
BY Roger Williams
ATTORNEY Nov. 2, 1948.   J. M. VAN BEUREN   2,452,880
ELECTRONIC VOLTMETER Filed July 8, 1944   3 Sheets-Sheet 3

INVENTOR.
John M. van Beuren
BY Roger Williams
ATTORNEY

Patented Nov. 2, 1948

2,452,880

UNITED STATES PATENT OFFICE 2,452,880

ELECTRONIC VOLTMETER

John M. van Beuren, Morristown, N. J., assignor to Measurements Corporation, Boonton, N. J., a corporation of New Jersey Application July 8, 1944, Serial No. 544,123

6 Claims. (Cl. 171—95)

This invention relates to electronic voltmeters and more especially to voltmeters adapted for the measurement of the peak values reached by voltage pulses of relatively short duration, or the peak values reached by alternating voltages of other than sine wave form.

One object of this invention is to provide an electronic voltmeter capable of indicating transient peak values with a relatively high degree of accuracy.

Another object of this invention is to provide an electronic voltmeter in which the final indicating instrument having moving parts will be set into motion immediately upon the application to the voltmeter of the voltage to be measured, so that less time than usually demanded will be consumed by the movement of the meter toward the ultimate point of indication.

Yet another purpose of this invention is to provide an electronic voltmeter which will indicate with comparatively great accuracy the peak value of an alternating voltage differing in form from the usual sine wave.

A still further object of this invention is to provide an electronic voltmeter in which a single isolated voltage pulse of relatively short duration will act immediately upon the indicating instrument proper, without any lag due to the charging or discharging of capacity elements in the circuit.

A further purpose of this invention is to provide a single electronic voltmeter adapted to make measurements of three different types, namely, negative peaks, positive peaks, and peak to peak, and especially adapted for the measurement of wave forms where such peaks are of relatively short duration.

Still another object of this invention is to provide, in an electronic meter of the type just mentioned, corrective arrangements to compensate for inequalities or unbalance between the various elements employed, and also to compensate for errors arising from contact potentials occurring in electronic rectifiers used in such meter.

Still another purpose of this invention is to provide an electronic voltmeter of the type just described in which the number of electronic tubes needed and the number of elements ancillary to such tubes is kept at a minimum, by causing at least one of the tubes or other elements to perform a dual function in the voltmeter.

Reference is now made to the hereunto appended drawings, wherein:

Fig. 1 is a schematic representation of an electronic voltmeter as hitherto used in the art and constituting one element of the structure of the invention.

Fig. 2 schematically represents an improved form of voltmeter, more especially adapted for the measurement of other than continuous voltage.

Fig. 3 shows a further development of the voltmeter of Fig. 2, according to this invention.

Fig. 4 is a graphical representation of the electrical variations taking place in certain portions of the device of Fig. 3.

Fig. 5 represents another type of variation occurring when pulses are measured with the device of Fig. 3.

Fig. 6 shows a still further development of the meter of Fig. 3, in which certain elements operate multifunctionally.

Figure 7:
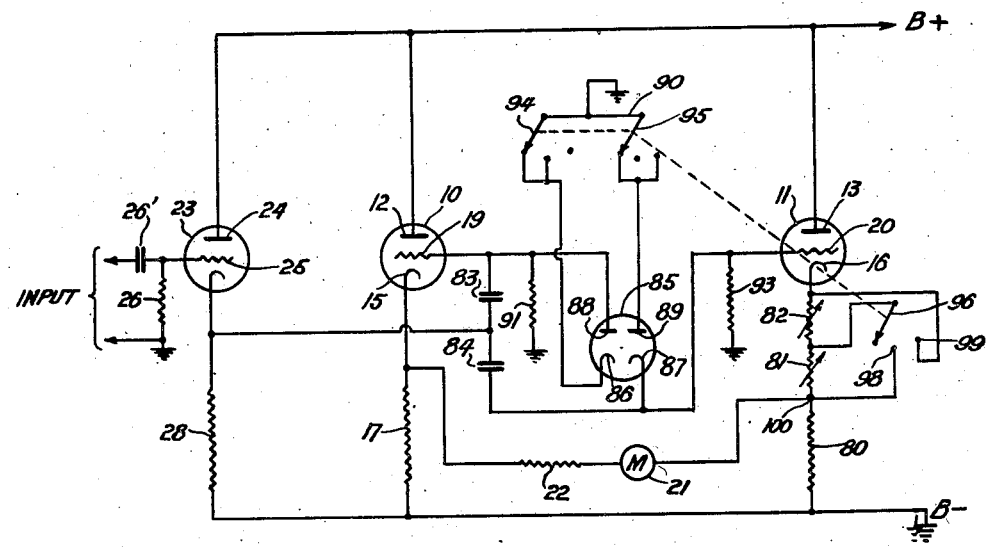
Fig. 7 shows a development of the meter of Fig. 3, in which a switching device is provided for changing the type of reading obtained and corrective devices are provided to compensate for certain errors.

Referring now to Fig. 1, two triodes, 10 and 11, have their respective anodes, 12 and 13, fed from a common source of positive potential via a null adjusting potentiometer 14, this potentiometer allowing inequality in the constants of the triodes, or other elements in the circuit, to be compensated. The cathodes 15 and 16 of the respective tubes, are each connected to one end of a corresponding resistance 17 or 18, the connections being such that the tubes are arranged as cathode followers. The other ends of resistances 17 and 18 are connected to the negative terminal of the source of potential feeding anodic voltage to the tubes. The grid 19 of the tube 10 constitutes one input terminal, and the other input terminal is constituted by the ground, to which is also connected grid 20 of tube 11. A meter 21 of suitable type is connected with a resistance 22, which latter functions as a sensitivity control. The meter and resistance are connected in series between cathodes 15 and 16.

The operation of the electronic voltmeter just described is well known in the art, and a detailed discussion thereof is considered to be superfluous. However, a meter of this type presents the disadvantage that it can be used for the measurement only of direct current potentials. Nevertheless, this type of meter does present the advantages of having a high input impedance, high stability and of being completely degenerated.

Referring now to Fig. 2, there is here shown a meter in which the fundamental circuit of the meter of Fig. 1 has been expanded by the addition thereto of other elements, so that it may be employed in the measurement of non-continuous voltages. These additional elements include an input electronic tube, a rectifier, and a filter, all of which act to transform an applied voltage of discontinuous type to a corresponding continuous current, which latter is then fed to the portion of the meter which embodies the circuit of Fig. 1.

In Fig. 2 triode 23 has the anode 24 connected to a source of suitable positive potential and the grid 25 grounded via a suitable input resistance 26. The voltage to be measured is applied across the terminals of this resistance. In case that such voltage contains a continuous component, isolation condensers may be employed in series with one or both input leads, as well known in the art. The cathode 27 of tube 23 is fed from the negative terminal of the source of anode potential, via a suitable resistance 28. Cathode 27 is coupled via condenser 29 to the anode 30 of a diode rectifier 31, the cathode 32 of which is grounded and connected to the anode via discharge resistance 33.

The output of tube 31 is fed into a filter comprising series resistance 34 and shunt condenser 35, the free terminal of this last condenser being grounded. The output of this filter circuit appears at junction point 36 which is connected to the input grid 19 of tube 10. The remaining elements of Fig. 2 may be identical with those of Fig. 1 and bear corresponding reference numerals.

In the operation of the meter shown in Fig. 2, on the arrival of the first positive peak, grid 25 will go positive, thus causing cathode 27 to assume a similar potential. This operation continues until the peak positive value is reached. This potential induces a charge upon condenser 29, which latter transfers the charge to diode 31, this diode presenting a suitable internal path for current flow during the charging of condenser 29. When the peak value has been reached and the input voltage drops off from the peak value, the path afforded by diode 31 becomes no longer available, due to the unilateral conductivity exhibited by the diode. Accordingly the charge on condenser 29 can only be dissipated by leaking off through resistance 33. This resistance is preferably made to have as great a value as possible, consistent with the current to be measured, the time allowable for restoration of the circuit before measurement of another voltage, and the size of condenser 29. It has been found that condenser 29 may be 0.25 microfarad and resistance 33 may be 10 megohms, but such values are purely illustrative and not limiting.

The output from the portion of the meter just described still contains an alternating current component, and in order that indicating meter 21 be kept from fluctuating, especially when voltages of relatively low frequency are being measured, it is desirable that such component be removed. The filter circuit comprised by resistance 34 and condenser 35 tends to remove any fluctuations and to deliver a substantially continuous voltage to grid 19. The voltage applied to grid 19 then causes the operation of indicating meter 21, triodes 10 and 11 being connected and functioning in the same manner as already described in connection with Fig. 1. Cathode resistances 28, 17 and 18 may conveniently be of the order of 50,000 ohms, when employing triodes of the type commonly used in electronic devices handling small amounts of energy and when the supply of high tension energy is of the order of 150 volts, but such values are given by way of illustration and not of limitation.

While a meter of the form shown in Fig. 2 will operate satisfactorily when the voltage to be measured is of a sine wave form or the peak persists for a relatively great length of time, yet difficulty arises when short or isolated pulses are to be measured. While condenser 29 is taking on a charge, the filter circuit composed by resistance 34 and condenser 35 has a sufficiently high time constant, so that condenser 29 will tend to discharge to some degree, through resistance 33, before grid 19 has received the full peak potential. This phenomenon causes a measurement of isolated or short pulses to exhibit considerable error, in that the readings will be erroneously low. However, the form of meter shown in Fig. 2 possesses the advantage that the impedance of the input circuit may be made very much higher than that encountered when a simple diode rectifier is employed to convert discontinuous current into continuous current. This particular feature allows the meter to be employed for measurements of circuits which have relatively high impedances, without causing abnormal or changed conditions in such circuits by being connected thereto.

Another advantage of this form of meter, employing an input tube connected as a cathode follower, is that the effective output impedance of such input tube will be comparatively low. For example, with one type of tube suitable for the purpose, the effective output impedance will be in the neighborhood of 500 ohms. This relatively low output impedance enables the condenser connected to the diode to be charged in a comparatively short period of time, thus enabling the measurement of very short pulses of voltage to be readily accomplished, and to a degree compensating for the error, due to the condenser discharge, which has previously been discussed.

The form of this invention shown in Fig. 3 retins the desirable feature of presenting high input impedance, while at the same time it overcomes, to a large measure, the disadvantage of greatly erroneous readings, when transient or pulse voltages are to be measured. In this form of the invention, triode 23 is connected in the same manner as in the case of Fig. 2, and is connected to ground via resistance 26, while the voltage to be measured is fed to the terminals of this resistance via isolation condenser 26'. The output of triode 23 is similarly fed through coupling condenser 29 to diode 31. From diode 31, the rectified voltage passes directly to grid 19 of triode 10, no filter circuit being needed at this point, for reasons hereinafter to be explained. Meter 21 and sensitivity control resistance 22 are similarly connected in series between cathodes 15 and 16, while the source of high potential energy reaches these cathodes through resistances 17 and 18 and is applied to anodes 12 and 13 via balancing potentiometer 14. All the elements just described may be similar to the correspondingly numbered elements in Figs. 1 and 2 and will function in a generally similar manner.

With the elements already described, it can be seen that the voltage reaching grid 19 will possess an alternating voltage component, which would cause undesirable fluctuations or erroneous readings of meter 21, especially as the frequency of the voltage to be measured becomes relatively low and approaches zero. Therefore, it is necessary to compensate for the fluctuations in the voltage reaching meter 21, due to these alternating voltage components. To accomplish this result, grid 20 of tube 11 is not connected directly to the ground, as was the case in the meter shown in Fig. 2, but is grounded through a relatively high resistance 50. The junction point 51 between the grid and resistance is coupled via a condenser 52, back to cathode 27. The alternating voltage components impressed upon triode 10, theerfore, are also impressed upon triode 11 and accordingly are balanced out upon the two sides of meter 21, thus eliminating, or reducing to negligible proportions, the undesirable effects previously described as adversely influencing meter 21.

The employment of condenser 52 and resistance 50 with the connections shown in Fig. 3 tends to overcome the errors occurring when pulse voltages are to be measured. The elimination of filter 34, 35 (Fig. 2) allows the potential appearing across diode 31 to be instantaneously impresesd upon grid 19, so that this source of error is reduced substantially to zero.

There still would exist, however, other sources of error in the form of meter shown in Fig. 3, were condenser 52 and resistance 50 not employed. Considering a voltage surge or pulse applied to the input circuit of triode 23, this surge will reach the side of condenser 29 connected to cathode 27, but the other side of condenser 29, connected to diode 31 may not rise to the peak positive potential as rapidly as needed in order to give a proper indication upon meter 21, due to the fact that this last mentioned side of condenser 29 is continuously discharging to ground via resistance 33. With the additional coupling connection afforded by condenser 52 and resistance 50, it can be seen that the voltage appearing upon cathode 27 will be almost instantaneously impressed upon grid 20 of triode 11. The time constant of the circuit 52, 50 should be large at the frequencies to be measured. A suitable but merely illustrative value for resistance 50 is 1 megohm and for condenser 52 a suitable value is $\frac{1}{10}$ microfarad. With these particular values, measurements of frequencies down to 5 cycles may be made without serious errors.

Another advantage arising from the use of coupling circuit 52, 50 is that a rise of potential on cathode 27 will cause an almost immediate application of driving voltage to meter 21. In other words, meter 21 will start to move toward its point of indication at almost the instant that voltage to be measured is applied to triode 23. This means that, when a surge or pulse of extremely short duration is to be measured, the meter 21 will tend to lag less behind the peak of such surge and will approach nearer to furnishing an indication representing the true value of such peak.

Reference is now additionally made to Fig. 4, where the operation of the meter of Fig. 3, with respect to an applied alternating voltage, is graphically represented. Curve 60 represents the potential values assumed by grid 20 when a sine wave, or similar form of wave is applied to triode 23. Due to the coupling action of condenser 52, the potential of grid 20 rises at almost the rate at which the potential applied to triode 23 increases. On the other hand, curve 61 shows that, due to the flow of charging current through diode 31, the potential impressed upon grid 19, represented by curve 61, fails to reach the same maximum as does curve 60, but the negative portion of curve 61 has substantially double the value of curve 60, due to the action of the diode rectifier.

In Fig. 5 the potentials assumed by grid 20 when a square wave form is applied to triode 23 are shown by the solid line 62, while dotted line 63 shows the corresponding values assumed by grid 19 of triode 10. It can be seen that the same considerations apply in this case, as were just discussed in connection with Fig. 4. In other words, the provision of coupling circuit 52, 50 has caused meter 21 to be supplied with actuating current almost as soon as the wave to be measured has been applied to triode 23, thus affording the possibility of reading a pulse of relatively short duration.

In connection with Figs. 3, 4 and 5, it is to be noted that, although the filter corresponding to 34, 35 of Fig. 2 has been removed, yet the bucking action due to alternating voltage components feeding through condenser 52, causes meter 21 to be supplied with substantially continuous current, so that the error previously described as arising from alternating current reaching meter 21, is reduced to a minimum and substantially eliminated.

Actual tests made upon a meter constructed in the form of Fig. 3 have shown that, with a single voltage pulse of very short duration, it is possible to obtain upon the meter an indication approaching 70% of the true peak value, whereas with the usual type of electronic voltmeter, a pulse of similarly short duration will indicate only about 5% of the true peak value. Other tests made with the meter of this invention have shown that it will indicate, with an accuracy within 2%, the value of a wave which contains only about 1% of the power content of a sine wave having the same peak value.

In Fig. 6 is shown a form of my invention wherein triode 70 is so connected as to perform simultaneously the function performed by the triodes 23 and 11, shown in Fig. 3. Triode 10 performs the same function as in the case of Fig. 2 and has its grid directly connected to diode 31. The diode receives its input via condenser 29 from cathode 71 of triode 70, and condenser 29 discharges via resistance 33. The input circuit through triode 70 may be identical with the input circuit of triode 23 of Fig. 3. Meter 21 is connected between the cathodes 71 and 15 and therefore functions in the same manner as when connected between triodes 10 and 11 (Fig. 2). In the form of meter of Fig. 6, triode 70 not only acts to feed diode 31, but also acts in a bucking capacity with respect to alternating current, corresponding to that accomplished by triode 11 of Fig. 3. Since the incoming signal is applied directly to grid 72, there is no need of a coupling circuit corresponding to 52, 50 of Fig. 3. A rising potential on grid 72 will be immediately reflected to cathode 71, and since meter 21 is also connected to this cathode, it will respond immediately to such rising potential. On the other hand, the voltage developed by the rectified current will be applied to grid 19 of triode 10 in the same manner as described in connection with Fig. 3, and since cathode resistance 73 corresponds not only to resistance 28 of Fig. 3 but also to resistance 18 of Fig. 3, triodes 70 and 10 constitute a coupled circuit of the cathode follower type and therefore will additionally function in the same manner as do triodes 10 and 11 of the form of meter previously shown in Fig. 3.

In Fig. 6 it will be noticed that input triode 70 has the anode 74 thereof connected to a suitable source of potential via potentiometer 14, for the purpose of initially balancing triodes 70 and 10. This arrangement is similar to that already shown in Fig. 3. However, while such means of adjustment is satisfactory with respect to the functioning of tube 70 as an output or indicator tube, yet the interpositioning of a portion of the resistance of potentiometer 14 into the output circuit of tube 70, causes an undesirably high output impedance of this tube, when viewed in the light of an input tube, connected as a cathode follower. It is possible to connect a bypass condenser 75 in shunt with the portion of potentiometer 14 which is included in this anode circuit, and thus to reduce the effective tube output impedance for voltage pulses. However, it is desirable to avoid the necessity of this bypass condenser, which offers a varying impedance to currents of various frequencies. Accordingly the anode potential supply may be connected directly to the respective anodes of tubes 70 and 10 and the balancing of these two tubes may then be accomplished by varying either the bias upon grid 72, or the portion of resistance 73 included in the circuit of meter 21. Any suitable and well known method of changing the grid bias may be employed. In order to change the connection of meter 21, it is possible to change the connection of lead 21' from the upper extremity of resistance 73, to some intermediate point upon this resistance, for example, by using a variable tap connection, thus adjusting the steady state current through meter 21 to a suitable value, for example, zero.

The form of this invention shown in Fig. 6 dispenses with one triode and certain of the elements associated therewith, thereby bringing about economy with respect to cost, space occupied and power consumption.

For purposes of illustration, it has been found that triodes of the type known as 6J5 or 6C5 are suitable for both triodes shown in Fig. 6. Additionally, it is possible still further to economize space by employing a so-called dual triode, such as the type known under the designation 6SN7, this electronic tube having within it all the elements corresponding to two separate triodes. While many different types of tubes may be employed with the meter of my invention, it has been found desirable to employ tubes having a high mutual conductance, provided that the grid current is kept relatively low. Since any grid current flowing in the input tube will impose a load upon the circuit to be measured, it is desirable that such load be minimized, for reasons previously explained.

In Fig. 7 it will be seen that the input tube 23 performs the same function as does this tube in the form of meter shown in Fig. 3, and the input and output circuits of this tube are similarly arranged and bear corresponding reference numerals. The balanced tubes 10 and 11 correspond to the similarly numbered tubes in Fig. 3, and tube 10 is provided with a similar cathode resistance 17. Tube 11 is provided with a cathode resistance comprising three sections; 80, 81 and 82, all connected in series with one another. Resistance 80 may be fixed in value, while resistances 81 and 82 are each made variable, for reasons hereinafter to be explained. It will be noted that the anodes 12 and 13 of tubes 10 and 11, respectively, are connected directly to the source of anode potential, rather than through the balancing potentiometer 14, shown in Fig. 3. This mode of connection is employed in this form of meter, since the balancing of the tubes may here be secured by adjustments of variable resistances 81 and 82, as later explained.

The output of tube 23 is taken from the upper end of cathode resistance 28 and is provided with alternative paths through condensers 83 and 84, respectively. The diode 85 employed in this form of meter is preferably of the double type, having independent cathodes 86 and 87, and independent anodes 88 and 89. The circuit through this diode is completed by ground connections for cathode 86 and anode 89, respectively, via selector switch 90, the detailed operation of this switch being later explained. Input grid 19 of tube 10 is connected to anode 88 and, via discharge resistor 91, to the ground, while input grid 20 of tube 11, is connected to cathode 87 and to ground via discharge resistor 93.

When selector switch 90 has the two movable arms 94 and 95 placed upon their respective contact points shown at the extreme left in the drawing, the functioning of diode 85 is as follows. Cathode 86 is now grounded through switch arm 94, and anode 89 is grounded through switch arm 95. The output of tube 23 can then have positive peaks fed through condenser 83 to anode 88 and thence via cathode 86, to ground, while negative peaks will be fed through condenser 84 to cathode 87 and via anode 89 to ground. The charging action of the two portions of diode 85 will then be cumulative in charging condensers 83 and 84 in series with one another. The peak to peak potential thus developed is impressed between grids 19 and 20 of the balanced indicator, thus allowing the reading of peak to peak potentials.

When switch 90 is so adjusted that contact arms 94 and 95 rest upon the middle contacts of the switch, the circuit via cathode 86 and anode 88 to ground is still completed and, therefore, condenser 83 will be charged up by the positive peaks flowing through this portion of the diode. On the other hand, the circuit from anode 89 to ground is opened at switch 90, so that the negative peaks will no longer find a path through the other portion of the diode. Therefore, condenser 84 does not receive any charge from such negative peaks and the potential impressed between grids 19 and 20 of indicator tubes 10 and 11, respectively, will correspond only to that of the positive peaks.

In order to adjust this form of meter for the measurement of negative peaks, switch arms 94 and 95 will be placed upon the contact points shown at the extreme right in the drawing. With switch 90 in this position, the circuit feeding cathode 86 is opened up, so that the positive peaks reaching anode 88 will no longer be effective in charging condenser 83. On the other hand, the circuit through cathode 87 and anode 89 to ground is still complete, so that condenser 84 will be charged by the negative peaks, and so that the meter will indicate the value of such negative peaks, when switch 90 is in this last described position.

As well known in the art, rectifier 85 will exhibit certain so-called contact potentials, even when no signal voltage is impressed thereupon. For example, when switch 90 is in the left hand position, there will be a negative potential at anode 88 and a positive potential at cathode 87. With one type of rectifier frequently employed in such circuits, these potentials will be of the order of magnitude of one volt each, but such value is purely illustrative. In any event, however, the contact potentials exhibited will be very low in comparison with the potential available from the anode supply circuit.

Attention is now called to the variable resistances 81 and 82 inserted between cathode 16 and the upper end of cathode resistance 80. A switch 96 has the contact arm thereof connected to point 97, between resistances 81 and 82, while contacts 98 and 99 are connected respectively to the other ends of these two resistances. It can be seen that when the contact arm of switch 96 is placed at the extreme left, the switch will perform no function. When the arm is placed on contact 98, resistance 81 will be short circuited and when the arm is placed on contact 99, resistance 82 will be short circuited. The circuit of indicating meter 21 extends from cathode 15 to the point 100, where resistance 80 is connected to resistance 81. When both resistances 81 and 82 are in the circuit, the connection of meter 21 to point 100 will allow resistances 80, 81 and 82 to act as a voltage divider. By adjusting resistance 82 to a suitable value, the voltage developed across this resistance may be made equal and opposite to the contact potential developed by anode 88. Similarly, resistance 81 can be adjusted so as to develop a voltage compensating for the contact potential of cathode 87.

When switch 90 is placed in the left-hand position thereof, so as to measure peak to peak potentials, the contact potentials exhibited by diode 85 will be additive in nature and will tend to give an error, for example, amounting in all to a few volts. By suitable adjustment of resistances 81 and 82, an opposing and compensating potential will be applied to meter 21. When switch 90 is transferred to the middle or right-hand positions, so as to read single peaks only, the compensating potential developed by the additive effects of resistances 81 and 82 will be too great and would cause an error of opposite sign. Therefore, it is desirable to change the value of these compensating resistances, at the same time that the meter is switched from one position to another. This is readily accomplished by mechanically connecting together switches 90 and 96. It is furthermore desirable that the two contact arms 94 and 95, of switch 90, be mechanically coupled together. With the employment of such coupling, switches 90 and 96 will function as follows. In the left hand position the rectifier is connected so as to read peak to peak potentials and both resistances 81 and 82 are in circuit. When the two switches are transferred to the middle position or the right hand position, the corresponding compensating resistance 81 or 82, which is no longer needed because of the opening of a path through one portion of rectifier 85, will be short circuited via switch 96. Therefore, it can be seen that the corrective potentials derived from these resistances will always correspond to the error causing contact potentials existing in the meter under any given set of connections. By way of example, but not of limitation, resistances 81 and 82 may be of the order of 500 ohms each, when using triodes and cathode resistors of the types previously mentioned.

Since anodes 12 and 13 are connected directly to the anode voltage supply, inequalities between the tubes and other elements of the circuits cannot be balanced by a potentiometer such as 14, shown in previously described forms of the meter. However, such balancing of the circuit may readily be accomplished by adjustments of resistances 81 and 82, so that these resistances perform the dual function of balancing the meter and of compensating for contact potential errors arising therein.

Figure 8:
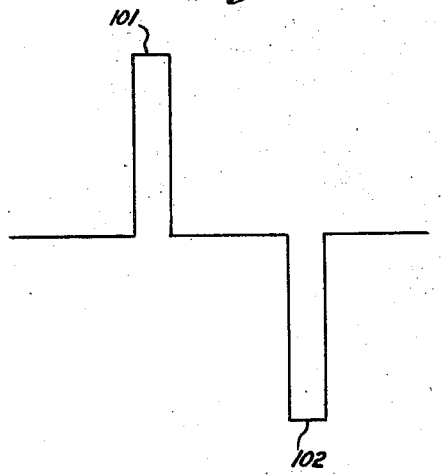
Fig. 8 is a graphical representation of one type of wave form which may be measured with the meter of Fig. 7.

In Fig. 8 is shown a sharply peaked wave form which may be readily measured with the embodiment of this invention just described. Portions 101 and 102 represent positive and negative peaks, respectively.

Figure 9:
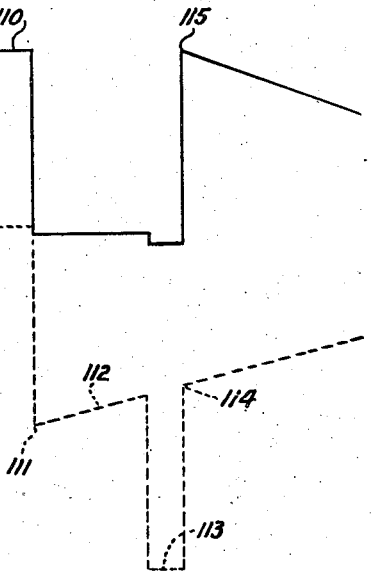
Fig. 9 shows the potential variations taking place in portions of the meter, when the wave form of Fig. 8 is applied thereto.

In Fig. 9 are shown graphs of the potentials developed when the meter of Fig. 7 is used as a peak to peak rectifier for the measurement of the wave form represented in Fig. 8. The full line indicates the potential impressed on tube 11, while the dotted line indicates the potential impressed on tube 10. As already explained in connection with Fig. 5, the potential on tube 11 will rise as indicated at point 110 and will again return to zero, while the potential on tube 10 will be driven to point 111. During the interval between positive and negative pulses, this potential will tend to return to zero as indicated by the sloping portion 112 of the curve. However, the negative pulse will furthermore drive the potential down to point 113. At point 114 it will be seen that the total potential impressed between tubes 10 and 11 will correspond to that indicated between points 114 and 115 and will equal the peak to peak potential of the wave form shown in Fig. 8.

While I have shown and described my invention in certain embodiments, many variations thereof will be apparent to one skilled in the art. For example, if the voltage to be measured has no direct current component which would effect the potential of the control grid of the input tube, it may be possible to dispense with the input filter 26, 26'. Likewise, the respective time constants of the filter circuits employed in the various forms of my invention may be altered over a comparatively wide range. It has been found possible to measure alternating voltages of a frequency as low as 2 cycles with substantially 100% accuracy, by such suitable choice of values, according to well-known principles of the art, for the various elements used in the electronic meter of this invention. While the use of triodes has been described, it will be apparent to one skilled in the art that other types of multi-element electronic discharge tubes may be alternatively employed, for example pentodes or hexodes.

While the input tube has been shown and described as a cathode follower, any other type of connection effectively affording a low output impedance may be employed in place of the cathode follower type of connection. Still other variations of the meter herein disclosed and described may be made without departing from the spirit of the invention, and I am limited only by the scope of the hereunto appended claims.

What is claimed is:

1. Electronic alternating current voltmeter including an input filter circuit for removing direct current components from the voltage to be measured, an input coupling tube, means connecting the output of said filter circuit to the input of said tube, a diode rectifier, means capacitatively connecting said diode to the output circuit of said tube, a balanced electronic direct current indicator including two tubes connected as cathode followers and a direct current meter connected between the cathodes of said indicator tubes, means connecting the input grid of one indicator tube to the output of said diode whereby rectified voltage is fed to said direct current indicator, a capacitative connection from the input grid of the other indicator tube to the output circuit of said input tube, and a resistance connected between said last mentioned grid and ground, whereby alternating voltage components are impressed in identical phase upon the respective tubes of said indicator and thereby maintain said indicator in balance with respect to said alternating voltage components.

2. Electronic alternating current voltmeter including two triodes, means for heating the cathodes thereof, means for supplying anode potential thereto, two cathode resistors, one connected from the cathode of each triode to the negative anode potential supply, a balancing resistor connected between the anodes of both said triodes, a variable tap making contact with said balancing resistor and connected to the positive anode potential supply so as to balance the respective anode currents of said triodes, a continuous current electromechanical meter connected between said cathodes so as to indicate unbalance of said triodes, a rectifier and shunt resistor connected between ground and the input grid of one triode, a condenser coupling said grid to the cathode of the other triode, and means for impressing an alternating voltage to be measured between the grid of said other triode and ground, whereby said alternating voltage is fed in identical phase to said respective two grids so as to maintain the balance of said triodes, while said alternating voltage is rectified, unbalances said triodes and actuates said electromechanical meter.

3. Voltmeter according to claim 2, wherein said balancing resistor and variable tap are replaced by a direct connection from the respective anode of each triode to said positive anode potential supply, and wherein said meter is connected between the cathode of one triode and a point upon the cathode resistor of the other triode, whereby said voltmeter can be balanced by selection of said point upon said cathode resistor.

4. Electronic alternating current voltmeter, including an input amplifier tube connected as a low impedance driver, two condensers connected in series with each other, a connection from the output circuit of said input tube to the common junction of said condensers, a double diode rectifier, a connection extending from the other terminal of one condenser to the anode of one diode of said rectifier, a connection extending from the other terminal of the other condenser to the cathode of the other diode of said rectifier, selective switching means for grounding at least one otherwise unconnected and predetermined electrode of said rectifier, a direct current indicator including two balanced tubes connected as cathode followers and a direct current meter connected between the cathodes of said indicator tubes so as to indicate unbalance thereof, and a connection from each grid of said balanced tubes to said other terminal of a respective condenser and, via a discharge resistor, to ground, whereby said voltmeter can read positive peaks, negative peaks, and peak to peak voltages, according to the electrodes of said rectifier grounded by said selective switching means.

5. Device according to claim 4, additionally including two adjustable corrective resistors connected in series between the cathode of one balanced tube and the connection point of said direct current meter thereto, each of said corrective resistors being adjusted to give a voltage correcting undesired potentials existing when a given electrode of said rectifier is grounded, second selective switching means shunting a pretermined one of said corrective resistors, and mechanical means coupling said first and said second selective switching means, whereby the grounding of a given rectifier electrode simultaneously shunts the corrective resistor corresponding to the electrode not so grounded and whereby grounding of both electrodes leaves both corrective resistors unshunted and in circuit.

6. A peak electronic voltmeter including a direct current indicator comprising two triodes connected as cathode followers, a supply furnishing anode potential thereto, resistors extending respectively from the cathode of each triode to the negative pole of said anode supply, means for balancing the respective anode currents, and a direct current meter connected between said cathodes, also including means for converting alternating current to be measured to direct current for the actuation of said indicator, said last means comprising an input triode, a resistor connecting the cathode thereof to said negative pole, means connecting the cathode thereof to the positive pole of said anode supply, means for connecting said alternating current to the grid of said input triode, a diode capacitively connected to the input triode in shunt with said cathode resistor thereof, a discharge resistor connected between two unlike elements of said diode, and a connection from the output of said diode to the grid of at least one of said triodes of the direct current indicator, whereby alternating current to be measured as to voltage is fed through said input tube to said diode, is rectified thereby, unbalances said direct current indicator, and thereby actuates said direct current meter, also including capacitive coupling means extending from the output of said input triode to the grid of at least one of said indicator triodes, whereby alternating current components of the output of said diode are balanced out on said direct current indicator.

JOHN M. van BEUREN.

REFERENCES CITED

The following references are of record in the file of this patent:

UNITED STATES PATENTS

| Number | Name | Date |
| --- | --- | --- |
| 2,316,044 | Blair | Apr. 6, 1943 |
| 2,324,215 | Kinsburg | July 13, 1943 |
| 2,360,523 | Simmons | Oct. 17, 1944 |
| 2,364,687 | Banker | Dec. 12, 1944 |